(12) United States Patent
Giannetti

(10) Patent No.: US 11,281,503 B2
(45) Date of Patent: Mar. 22, 2022

(54) AUTOMATED CORE SERVICES BOOTSTRAP FOR ON-PREMISES CLUSTERS

(71) Applicant: MASTERCARD INTERNATIONAL INCORPORATED, Purchase, NY (US)

(72) Inventor: Fabio Giannetti, Los Gatos, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 134 days.

(21) Appl. No.: 16/865,547

(22) Filed: May 4, 2020

(65) Prior Publication Data

US 2020/0348918 A1   Nov. 5, 2020

Related U.S. Application Data

(60) Provisional application No. 62/843,537, filed on May 5, 2019.

(51) Int. Cl.
| | |
|---|---|
| *G06F 9/44* | (2018.01) |
| *G06F 9/50* | (2006.01) |
| *G06F 11/30* | (2006.01) |
| *G06F 11/34* | (2006.01) |
| *G06F 16/23* | (2019.01) |
| *G06F 8/60* | (2018.01) |
| *H04L 61/3015* | (2022.01) |

(52) U.S. Cl.
CPC .............. *G06F 9/5083* (2013.01); *G06F 8/60* (2013.01); *G06F 11/3006* (2013.01); *G06F 11/3433* (2013.01); *G06F 16/2358* (2019.01); *H04L 61/3025* (2013.01)

(58) Field of Classification Search
None
See application file for complete search history.

(56) References Cited

U.S. PATENT DOCUMENTS

| | | | |
|---|---|---|---|
| 7,730,091 B2 | 6/2010 | Buckler et al. | |
| 8,412,810 B1* | 4/2013 | Tompkins | G06F 9/5072 709/223 |
| 8,949,308 B2 | 2/2015 | Chintalapati et al. | |
| 8,984,101 B1* | 3/2015 | Viswanath | H04L 67/2842 709/220 |
| 9,172,608 B2* | 10/2015 | Zeyliger | G06F 11/328 |
| 9,229,703 B1 | 1/2016 | Hamer | |

(Continued)

*Primary Examiner* — Anna C Deng

(57) ABSTRACT

The disclosure herein describes deploying an application cluster based on a cluster definition and service templates. A cluster definition is obtained from a repository and a cluster is created on a cluster platform based on the cluster definition. A cluster type of the cluster is identified based on the cluster definition and a service set is determined from a service map based on the identified cluster type, the service map including at least one cluster type mapped to at least one service. A service deployment template of each service of the service set is obtained and each service of the service set is deployed on the created cluster based on the obtained service deployment templates, whereby the cluster is configured for use according to the cluster type. Using service deployment templates mapped to cluster types enables efficient, flexible automated deployment of clusters with a wide variety of configurations.

20 Claims, 5 Drawing Sheets

(56) References Cited

U.S. PATENT DOCUMENTS

| | | | |
|---|---|---|---|
| 9,270,521 B2 | 2/2016 | Tompkins | |
| 9,367,360 B2 | 6/2016 | Jubran et al. | |
| 9,729,615 B2 | 8/2017 | Nair | |
| 10,225,335 B2 * | 3/2019 | Fu | H04L 67/10 |
| 2003/0225851 A1 * | 12/2003 | Fanshier | G06F 8/61 |
| | | | 709/208 |
| 2010/0332684 A1 * | 12/2010 | Selitser | G06F 8/656 |
| | | | 709/250 |
| 2016/0043892 A1 | 2/2016 | Hason et al. | |
| 2017/0085419 A1 | 3/2017 | Zhang et al. | |
| 2017/0249374 A1 * | 8/2017 | Parees | G06F 9/44 |
| 2020/0218580 A1 * | 7/2020 | Kim | G06F 9/5077 |

\* cited by examiner

US 11,281,503 B2

AUTOMATED CORE SERVICES BOOTSTRAP FOR ON-PREMISES CLUSTERS

CROSS-REFERENCE TO RELATED APPLICATION

This application claims priority to U.S. Provisional Application No. 62/843,537, filed May 5, 2019, the entirety of which is incorporated herein by reference.

BACKGROUND

Applications associated with handling sensitive data, such as transaction processing, storing and using customers' account information or other financial information, etc., have an increased need for security and isolation from other applications (e.g., applications used by MASTERCARD have such increased security and isolation requirements). Maintaining clusters of such applications is not easy, and managing several different clusters simultaneously presents increased challenges. Creating new clusters and provisioning all the "core services" needed for applications to be deployed requires a significant amount of time and effort from technicians or other knowledgeable users. Further, in some examples, different clusters have different needs: some clusters may run a single dedicated application while other clusters run multiple applications. The core services needed by a cluster varies based on the type of application or applications running thereon.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for deploying an application cluster based on a cluster definition and service templates is described. A cluster definition is obtained from a repository and a cluster is created on a cluster platform based on the cluster definition. A cluster type of the cluster is identified based on the cluster definition and a service set is determined from a service map based on the identified cluster type, the service map including at least one cluster type mapped to at least one service. A service deployment template of each service of the service set is obtained and each service of the service set is deployed on the created cluster based on the obtained service deployment templates, whereby the cluster is configured for use according to the cluster type.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Figure 1:
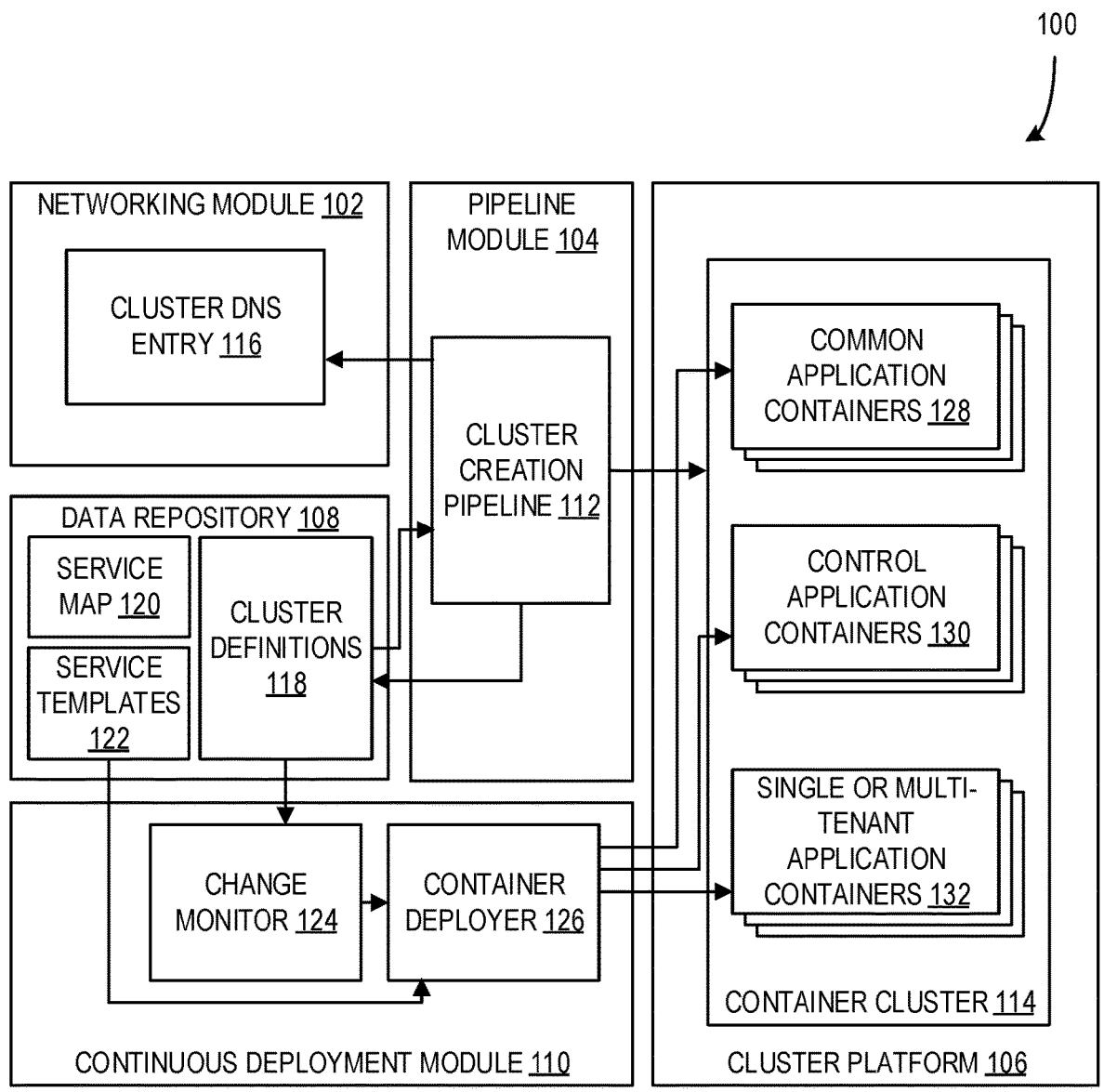
FIG. 1 is a block diagram illustrating a system configured for deploying a cluster on a cluster platform based on a cluster definition and service templates according to an embodiment.

Aspects of the disclosure provide a computerized method and system for deploying an application cluster based on a cluster definition and service templates. Upon receiving instructions to deploy the application cluster, a cluster definition is obtained from a repository and a cluster is created on an associated cluster platform based on the cluster definition. The cluster definition includes a cluster type of the cluster, which is used to determine a service set associated with the cluster from a service map, wherein the service map includes at least one cluster type mapped to at least one service. A service deployment template of each service of the service set is obtained and each service of the service set is deployed on the created cluster based on the obtained service deployment templates, whereby the cluster is configured for use according to the cluster type.

The disclosure addresses the challenges of creating and maintaining application clusters that have varied requirements, such as security and/or isolation requirements. The creation of clusters and provisioning of services thereon is performed in an automated way that is streamlined and flexible. The use of a robust set of cluster types and mapping those types to sets of associated services, which can be deployed using templates, enables the described system to handle the configuration of a huge variety of different application clusters automatically and further enables users to define new cluster types and associated service templates with relative ease. These features are configured to reduce the time and effort of users required to deploy clusters and improves the user-machine interface by providing users a way to define configurations of clusters and reuse those definitions.

Further, the disclosure operates in an unconventional way at least by monitoring the cluster definitions, service maps, and/or service templates for changes and, based on detecting changes, automatically redeploying services on clusters that are affected by the detected changes. These features significantly reduce the time and effort required of users to maintain complex application cluster configurations, reduce the occurrences of user-induced errors in such configurations, and increase the efficiency and security of the computing devices upon which the application clusters are hosted. Additionally, these features reduce the resource usage (e.g., processor resources, memory resources, and/or storage resources) by clusters that are out-of-date and enhances the efficiency of resource usage distribution across clusters, ensuring that clusters that are using resources are kept up-to-date and operational.

This disclosure describes systems and/or methods that provide for the automatic creation of container-based clusters (e.g., KUBERNETES clusters) for isolation and management of such applications, such that, when an application needs to be created or instantiated in a cluster, the container-based platform is configured to build the cluster first and then move the application onto the built cluster. The building of the cluster includes instantiating a "bare bones" cluster and then deploying and/or configuring "core services" thereon before using the cluster with the application. In some examples, such core services include one or more of monitoring components, logging components, tracing components, network policy components, and/or deployment namespace components. The disclosure describes a way of abstracting and/or generalizing the deployment of the core services such that they may be automatically deployed from a repository, based on service templates, into newly created clusters as needed based on the type of the clusters. In some examples, these core service deployment operations are performed with minimal or no input from users.

FIG. 1 is a block diagram illustrating a system 100 configured for deploying a cluster 114 on a cluster platform 106 based on a cluster definition 118 and service templates 122 according to an embodiment. The system 100 includes a networking module 102, a pipeline module 104, a data repository 108, a continuous deployment module 110, and a cluster platform 106. In some examples, the components of the system 100 include hardware, firmware, and/or software configured to operate as described herein. Further, it should be understood that the system 100 may be executed on one computing device or a plurality of computing devices organized according to known distributed computing techniques without departing from the description herein.

The data repository 108 of the system 100 includes one or more data stores configured for storing data in one or more known data structures. As illustrated, the data repository includes cluster definitions 118, a service map 120, and service templates 122. In some examples, the cluster definitions 118 are files or other data structures that include metadata defining clusters to be created on the cluster platform 106. The cluster definitions 118 include at least cluster identifiers or names and cluster types (e.g., control cluster, single tenant cluster, multi-tenant cluster). An example cluster definition 118, or cluster specification, is shown below.

apiVersion: kubernetes.mastercard.int/v1beta1
    kind: ClusterSpec
    metadata:
      name: cluster-specification
    spec:
      clusterURL: https://<Cluster URL>:<Cluster Port>
      clusterName: card-loyalty
      baseFQDN: <Cluster Domain Name>
      clusterType: cardLoyalty
      inheritFromTypes:
        singleTenant
        piiData
        pciCompliant
      clusterNodes: 10
      clusterPlan: medium The example cluster definition includes a "clusterName" of "card-loyalty" and a "clusterType" of "cardLoyalty" (e.g., indicating a primary or main cluster type of "card loyalty"). Further, the cluster definition includes an "inheritFromTypes" section associated with the type of the cluster enabling the cluster to inherit multiple other types beyond the defined cluster type of cardLoyalty. In this example, the cluster inherits the single tenant cluster type because the application will run on a dedicated cluster, the personal identifiable information (PII) data type because the loyalty program contains personal identifiable information and the application uses services associated with that information, and the payment card industry (PCI) compliant type because the application deals with points that can be redeemed into cash. In some examples, the cluster type and inherited types are used to determine the services to be deployed on the cluster as described herein (e.g., the services associated with the card loyalty type, the single tenant type, the PII data type, and the PCI compliant type are all deployed on the cluster associated with this cluster definition). The other information provided may also be used by the system 100 as described herein during creation and maintenance of a cluster based on this cluster definition. For instance, the "clusterURL" defines an uniform resource locator (URL) that can be used to communicate with the cluster once it is up and running, the "baseFQDN" indicates a fully qualified domain name (FQDN) of the cluster, and the "clusterNodes" entry indicates a number of nodes that will be used by or otherwise make up the cluster. The example cluster definition is in a format (e.g., formatted as a custom resource definition (CRD)) that is for use with a KUBERNETES-based platform, specifically, so the format and data elements of the definition are configured for compatibility with such a platform. It should be understood that, in other examples, other types of platforms and/or differing formats and/or data elements may be used in cluster definitions without departing from the description herein.

A cluster creation pipeline module 112 of the pipeline module 104 is configured to obtain cluster definitions 118 from the data repository 108 and initiate the creation of clusters (e.g., container cluster 114) in the cluster platform 106 based on those cluster definitions 118. The cluster creation pipeline 112 may include hardware, firmware, and/or software configured to use the cluster definitions 118 to perform operations to create associated clusters 114 as described herein. In particular, upon obtaining a cluster definition 118 from the data repository, the cluster creation pipeline 112 communicates with the cluster platform 106 to create a container cluster 114 based on the metadata in the cluster definition 118. Further, the cluster creation pipeline 112 communicates with the networking module 102 to create and/or configure a domain name system (DNS) entry 116 for the cluster (e.g., based on the FQDN thereof). After creation, the cluster 114 is largely empty and may only include configuration information and/or metadata that was present in the cluster definition 118 and/or used during creation of the container cluster 114.

After the container cluster 114 is created, it is provisioned with services (e.g., "core services") that are required for the cluster 114 to operate or otherwise of use to applications on the cluster 114. Depending on the type of the cluster, different sets of services may need to be deployed thereon. Further, the services associated with the cluster type and/or cluster type itself may change over time, such that monitoring for changes (e.g., via the change monitor 124) and redeployment of services based on detected changes may be performed (e.g., by the continuous deployment module 110) as described herein.

The service map 120 and service templates 122 stored in the data repository 108 are used by the continuous deployment module 110 to perform initial deployment of services and/or other applications on the newly created container cluster and redeployment or other wise updating of the services on the cluster in light of detected changes (e.g., by the container deployer 126). The service map 120 includes mappings of cluster types to sets of services that are used in clusters of the mapped type. An example service map is shown below.

```
kind: MappingSpec
metadata:
  name: mapping-specification
spec:
  common:
    project: common-services
    apps:
      - name: cluster-services
        folderName: cluster-services
        baseURL: ../../../../../core-deployments/
        automatedSync: true
      - name: es-curator
        folderName: es-curator
        baseURL: ../../../../../core-deployments/
        automatedSync: true
      - name: kubernetes-dashboard
        folderName: kubernetes-dashboard
        baseURL: ../../../../../core-deployments/
        automatedSync: true
      - name: logging
        folderName: logging
        baseURL: ../../../../../core-deployments/
        automatedSync: true
      - name: mc-crds
        folderName: mc-crds
        baseURL: ../../../../../core-deployments/
        automatedSync: true
      - name: monitoring
        folderName: monitoring
        baseURL: ../../../../../core-deployments/
        automatedSync: true
      - name: storage
        folderName: storage
        baseURL: ../../../../../core-deployments/
        automatedSync: true
      - name: velero
        folderName: velero
        baseURL: ../../../../../core-deployments/
        automatedSync: true
  control:
    project: control-services
    apps:
      - name: argocd
        folderName: argocd
        baseURL: ../../../../../core-deployments/
        automatedSync: true
      - name: argocd-applications
        folderName: argocd-applications
        baseURL: ../../../../../core-deployments/
        automatedSync: true
      - name: artifactory
        folderName: artifactory
        baseURL: ../../../../../core-deployments/
        automatedSync: true
      - name: global-monitoring
        folderName: global-monitoring
        baseURL: ../../../../../core-deployments/
        automatedSync: true
      - name: mc-ca-injector
        folderName: mc-ca-injector
        baseURL: ../../../../../core-deployments/
        automatedSync: true
      - name: secret-service
        folderName: secret-service
        baseURL: ../../../../../core-deployments/
        automatedSync: true
  piiData:
    project: pii-services
    apps: ...
      - name: pii-logging
        folderName: pii-logging
        baseURL: ../../../../../core-deployments/
        automatedSync: true
  pciCompliant:
    project: pci-services
    apps: ...
      - name: pci-compliance
        folderName: pii-compliance
        baseURL: ../../../../../core-deployments/
        automatedSync: true
  singleTenant:
    project: single-tenant-services
    apps:
      - name: es-logging
        folderName: es-logging
        baseURL: ../../../../../core-deployments/
        automatedSync: true
  multiTenant:
    project: multi-tenant-services
    apps:
      - name: argo
        folderName: argo
        baseURL: ../../../../../core-deployments/
        automatedSync: true
      - name: grafana-istio
        folderName: grafana-istio
        baseURL: ../../../../../core-deployments/
        automatedSync: true
      - name: jaeger
        folderName: jaeger
        baseURL: ../../../../../core-deployments/
        automatedSync: true
      - name: kiali
        folderName: kiali
        baseURL: ../../../../../core-deployments/
        automatedSync: true
      - name: tenant-monitoring
        folderName: tenant-monitoring
        baseURL: ../../../../../core-deployments/
        automatedSync: true
```

The example service map is in the form of a CRD that is compatible for use with a KUBERNETES-based system/platform. It is made up of a nested list of application or service metadata, with a list of applications and/or services for each type of cluster. The "spec:" level of the nested list includes six different sub-levels: common, control, piiData, pciCompliant, singleTenant, and multiTenant. Each sub-level includes a list of application and/or service entries, with each entry including a name of the service, a folder name indicating a folder in which the data associated with the service is stored (e.g., the service template of the service), a base URL indicating a location within the repository where the folder of the service can be found, and an automated sync indicator, which may be used by the system to determine whether the service should be automatically synchronized. In some examples, the "common" sub-level of the service map 120 indicates services that are deployed for all clusters, regardless of the type of the clusters, such that default services or otherwise required core services are listed in the common sub-level.

In other examples, a service map 120 may include more, fewer, or different cluster types without departing from the description herein. Additionally, or alternatively, the service map 120 may include more levels of cluster types with associated sets of services (e.g., a cluster may be configured to a cluster type and a cluster sub-type within that type, wherein each of the cluster type and cluster sub-type have sets of services that are included on a cluster of that configuration).

When the services to be deployed have been identified in the service map 120, the container deployer component 126 of the continuous deployment module 110 creates folders or other data structures in the cluster 114 and deploys the files and/or other data of the identified services from the service templates 122 to the created folders. The location of the folders that are created may be based on the configuration metadata of the cluster 114 from the cluster definition 118. The service templates 122 include information associated with clusters, such as "cluster name" and "base URL" data, that is templatized or genericized in the service templates 122 (e.g., specific data values replaced with generic placeholders such as "$ (CLUSTER_NAME)" or "$ (CLUSTER_FQDN)"). During deployment by the container deployer module 126, the generic placeholders of the service templates 122 are populated with specific data associated with the cluster 114 to which the services are being deployed. In some examples, all applications deployed to the container cluster 114 are deployed using genericized templates 122 that are filled with cluster-specific data when the code is interpreted at deployment. Such deployment data may be stored in a folder or other specific location on the system (e.g., the code-deployments folder).

In some examples, once cluster-specific files ("deployer files") for all the services have been created from the service templates 122 as described herein, the created deployer files are provided to a control cluster of the cluster platform 106. The control cluster is a cluster on the platform that is dedicated to provisioning and/or managing all other clusters on the platform/environment. The control cluster uses the deployer files to provision the newly created container cluster 114 with the services that will be used on that cluster. Then, the container deployer component 126 may use the deployer files to deploy all the services autonomously. Further, the deployer files may be preserved and/or maintained by the container deployer 126 or other components for use in redeploying services or otherwise updating services. In some examples, a separate provisioning job creates the deployer files from the service templates 122 as described herein and, upon passing off the deployer files to the control cluster and/or the container deployer 126 of the continuous deployment module 110, the separate provisioning job may be terminated successfully.

The change monitor 124 of the continuous deployment module 110 includes hardware, firmware, and/or software to monitor the cluster definitions 118 for changes and, as a result of detected changes, cause the container deployer 126 to redeploy or update services that are deployed on clusters associated with the detected changes. In further examples, the change monitor 124 is configured to monitor changes that occur on the service map 120 and/or service templates 122 as well and, as a result of detecting changes in those data structures, cause the container deployer 126 to update the associated services that are deployed in clusters on the cluster platform.

It should be understood that, while the system 100 of FIG. 1 shows common application containers 128, control application containers 130, and single or multi-tenant application containers 132 being deployed onto the container cluster 114 by the container deployer 126, in other examples, more, fewer, or different combinations of application containers may be deployed on a cluster without departing from the description herein. For instance, a container cluster of the control cluster type may only have control application containers and some common application containers deployed thereon from the container deployer.

In some examples, cluster definition files 118 and/or service template files 122 include associated templates that define locations within the repository where associated files and/or data structures are located. An example location template is shown below.
    kind: Kustomization
    bases:
        {{mapper.apps.baseURL}}
        ../../../specs/clusters/{{cluster.name}}
        ../../../specs/storage/s3

Figure 2:
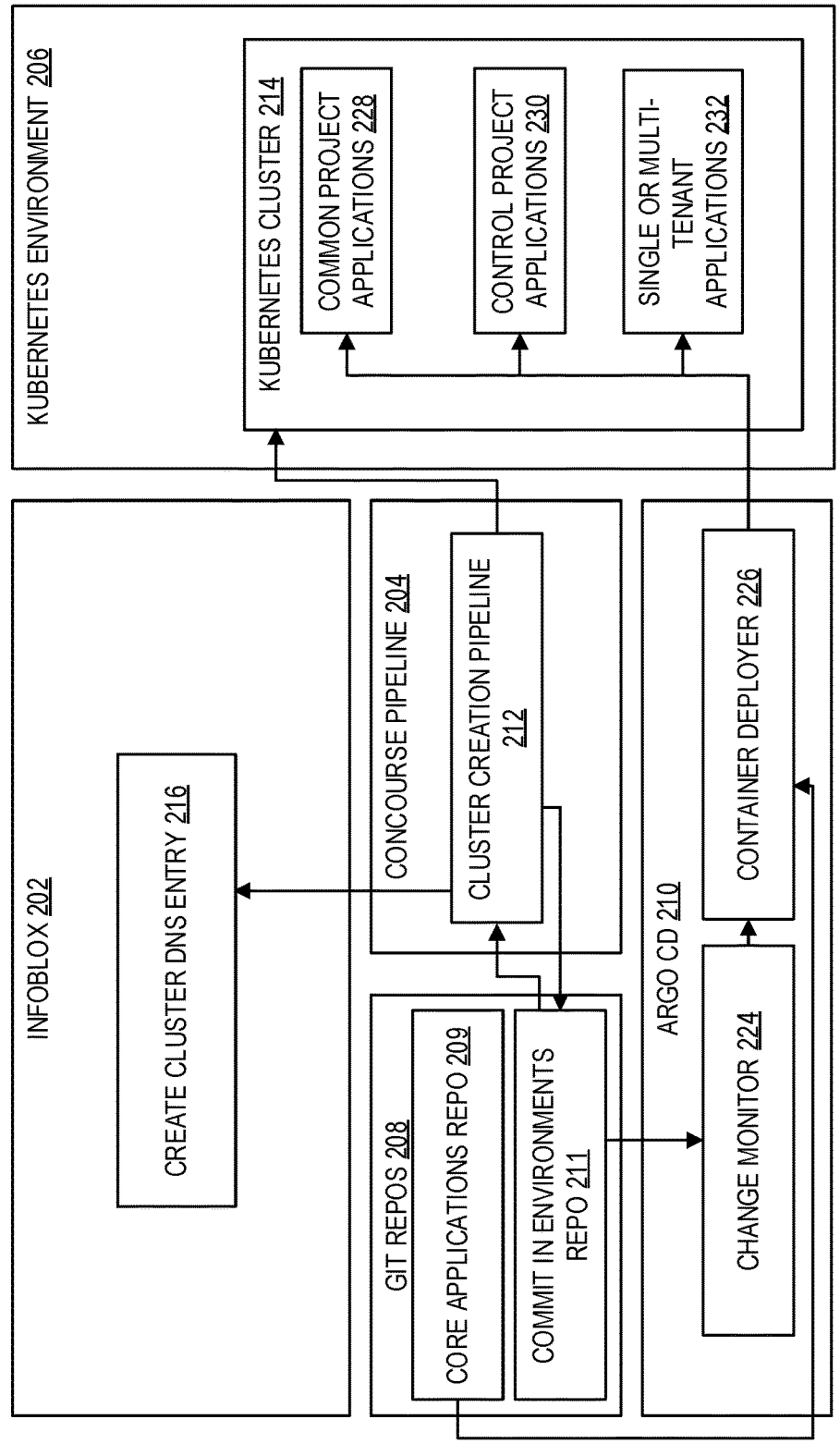
FIG. 2 is a block diagram illustrating a system configured in a similar manner to the system of FIG. 1, but including more specific examples of the components therein, according to an embodiment.

In further examples, a deployer application is defined based on the template shown below.

kind: Application
    metadata:
      name: {{cluster.name}}-{{mapper.apps.name}}
      namespace: argocd
    spec:
      destination:
        namespace: {{mapper.apps.name}}
        server: {{cluster.clusterURL}}
      project: {{mapper.project}}
      source:
        path: <path>
        repoURL: <repository URL>
        targetRevision: HEAD FIG. 2 is a block diagram illustrating a system 200 configured in a similar manner to the system 100 of FIG. 1, but including more specific examples of the components therein. In system 200, the networking module is an INFOBLOX module 202 configured to manage DNS entries 216 and the creation thereof for the system 200. The pipeline module is a CONCOURSE pipeline module 204 that is configured to automate the cluster creation tasks via a cluster creation pipeline 212. In some examples, the CONCOURSE module 204 is further configured to automate other tasks described herein, such as the provisioning tasks for creating cluster-specific deployer files from the generic templates in the repository.

The data repository is one or more GIT-based repositories, or GIT repos, 208 configured to store the cluster definitions, service templates and/or "core" application templates (e.g., the core applications repo 209 and the commit in environments repo 211), and a service map as described herein. Further, the GIT repository 208 is configured to enable version control of the files stored therein, exposing version data to the change monitor module for use in detecting changes to the stored files.

The continuous deployment module is an ARGO-CD module 210 configured to read the state of the files in the repository module 208 and continuously deploy applications and/or services on the clusters of the cluster platform based on the read state and/or detected changes to the state of the files.

The cluster platform is a KUBERNETES environment 206 that is configured to host KUBERNETES clusters (e.g., KUBERNETES cluster 214) as illustrated. Services and other applications, such as common project applications 228, control project applications 230, and single or multi-tenant applications 232, may be deployed to the KUBERNETES cluster 214 by the container deployer 226 and based on the configuration of the KUBERNETES cluster 214 by the cluster creation pipeline 212 as described herein. It should be understood the components shown in system 200 are exemplary and that, in other examples, more, fewer, and/or different modules may be used without departing from the description herein.

Figure 3:
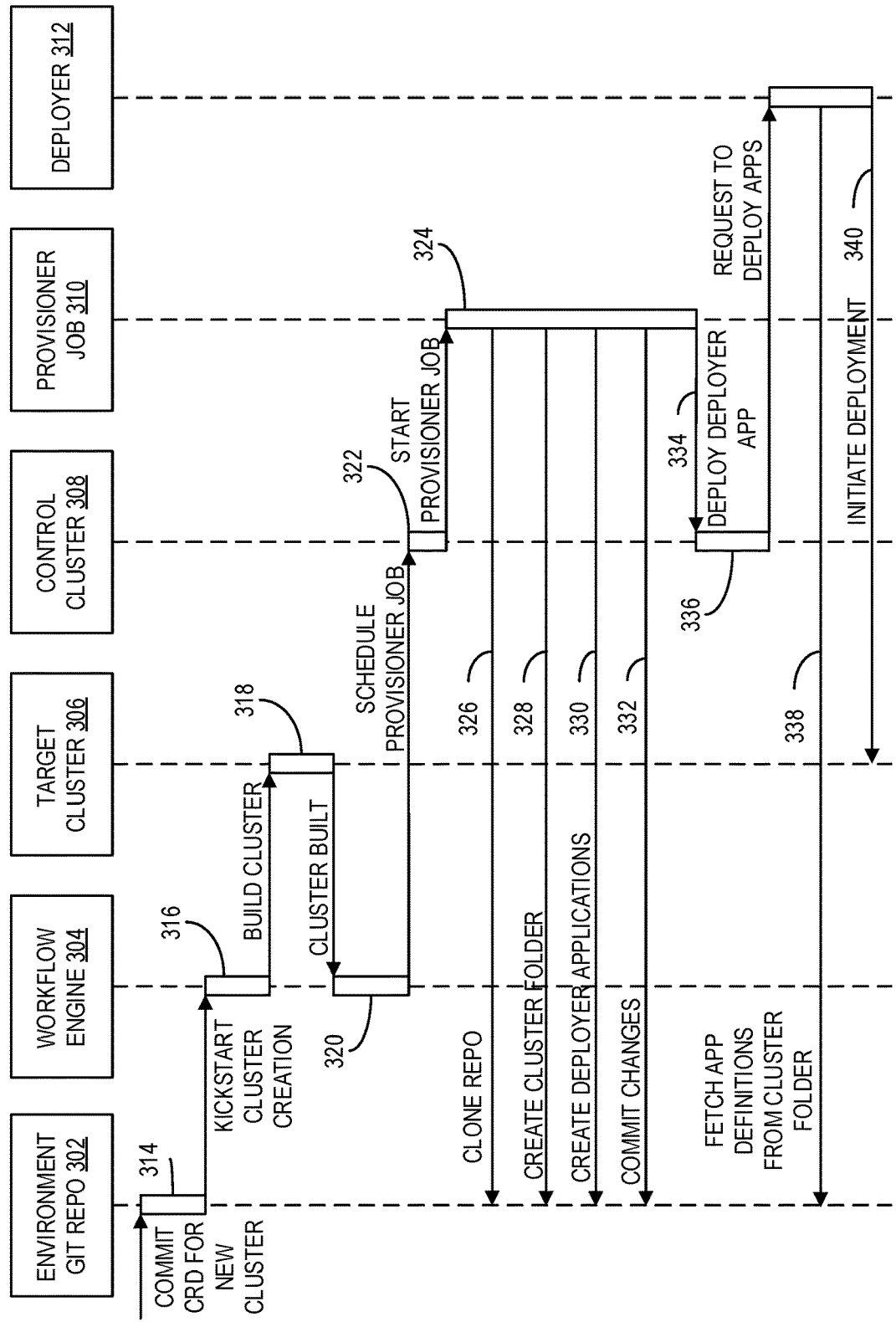
FIG. 3 is a sequence diagram illustrating a process of deploying a cluster based on a provided cluster definition according to an embodiment.

FIG. 3 is a sequence diagram illustrating a process 300 of deploying a cluster (e.g., target cluster 306) based on a provided cluster definition according to an embodiment. In some examples, the process 300 is performed at least in part on a system such as system 100 of FIG. 1 and/or system 200 of FIG. 2. At the beginning of the process, a user commits a CRD (e.g., cluster definition 118) for a new cluster to the environment GIT repo 302 at 314. The workflow engine 304 kickstarts or otherwise initiates the creation of a cluster based on the newly committed CRD at 316, resulting in the target KUBERNETES cluster 306 being built at 318. After the cluster is built, the workflow engine 304 schedules a provisioner job with the KUBERNETES control cluster 308 of the cluster platform at 320. The control cluster 308 starts the KUBERNETES provisioner job 310 at 322, which proceeds to create deployer files from templates in the repository. This process includes cloning the repository at 326, including at least the portions that are related to the target cluster, creating a cluster folder at 328 associated with the target cluster and copying all the related application and/or service files based on the Mapper CRD (e.g., the service map 120) and creating deployer application files at 330 that are specific to the target cluster 306. Those files are then committed, at 332, to the environment repo 302 and the deployer application files are sent to the control cluster 308 at 334. The control cluster 308 requests for the deployer module 312 to deploy the applications associated with the deployer application files at 336. The deployer module 312 fetches the app definitions from the cluster folder that were previously committed by the provisioner job 310 at 338 and initiates deployment of the associated applications on the target KUBERNETES cluster at 340.

Figure 4:
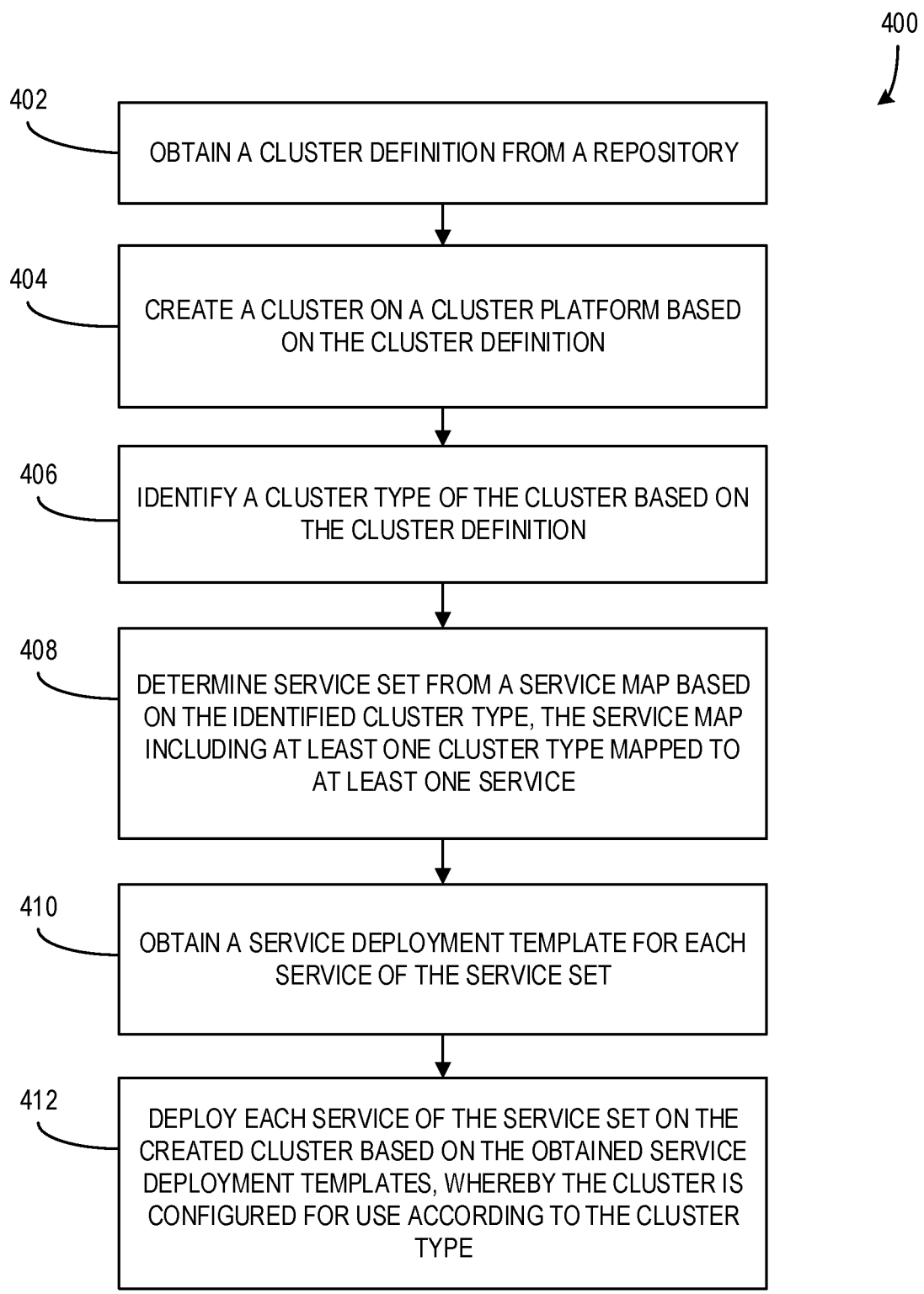
FIG. 4 is a flow chart illustrating a method for deploying an application cluster based on a cluster definition and service templates according to an embodiment.

FIG. 4 is a flow chart 400 illustrating a method for deploying an application cluster based on a cluster definition and service templates according to an embodiment. In some examples, the method is performed at least in part on a system such as system 100 of FIG. 1 and/or system 200 of FIG. 2. At 402, a cluster definition (e.g., cluster definition 118) is obtained from a repository (e.g., repository 108). The cluster definition includes metadata associated with a cluster to be deployed (e.g., container cluster 114) as described herein. The cluster definition may have been committed to the repository by a user and/or by another computer application or process. At 404, a cluster is created on a cluster platform (e.g., cluster platform 106) based on the cluster definition. In some examples, the created cluster includes a cluster name, a cluster type, and a location indicator indicating a location within the cluster platform.

At 406, the cluster type of the cluster is identified from the cluster definition and, at 408, a service set is determined from a service map (e.g., service map 120) based on the identified cluster type. The service map includes at least one cluster type mapped to at least one service. In some examples, the service map includes the cluster type of the newly created cluster and a plurality of services and/or applications that are associated with the cluster type. Further, the service map may include one or more common services or default services that are to be deployed on some or all types of clusters as described herein.

At 410, a service deployment template (e.g., service templates 122) for each service of the service set is obtained. In some examples, the service deployment templates are obtained from the data repository. The service deployment templates may include generic placeholders that are then populated with information specific to the newly created cluster to create deployer files as described herein. At 412, each service of the service set is deployed on the created cluster based on the obtained service deployment templates, whereby the cluster is configured for use according to the cluster type.

Additional example Templates/Schema and monitoring templates are shown below in Appendix A. These files describe the structure of CRDs for use in deploying clusters and an example set of template files for a monitoring service as described herein.

Exemplary Operating Environment

Figure 5:
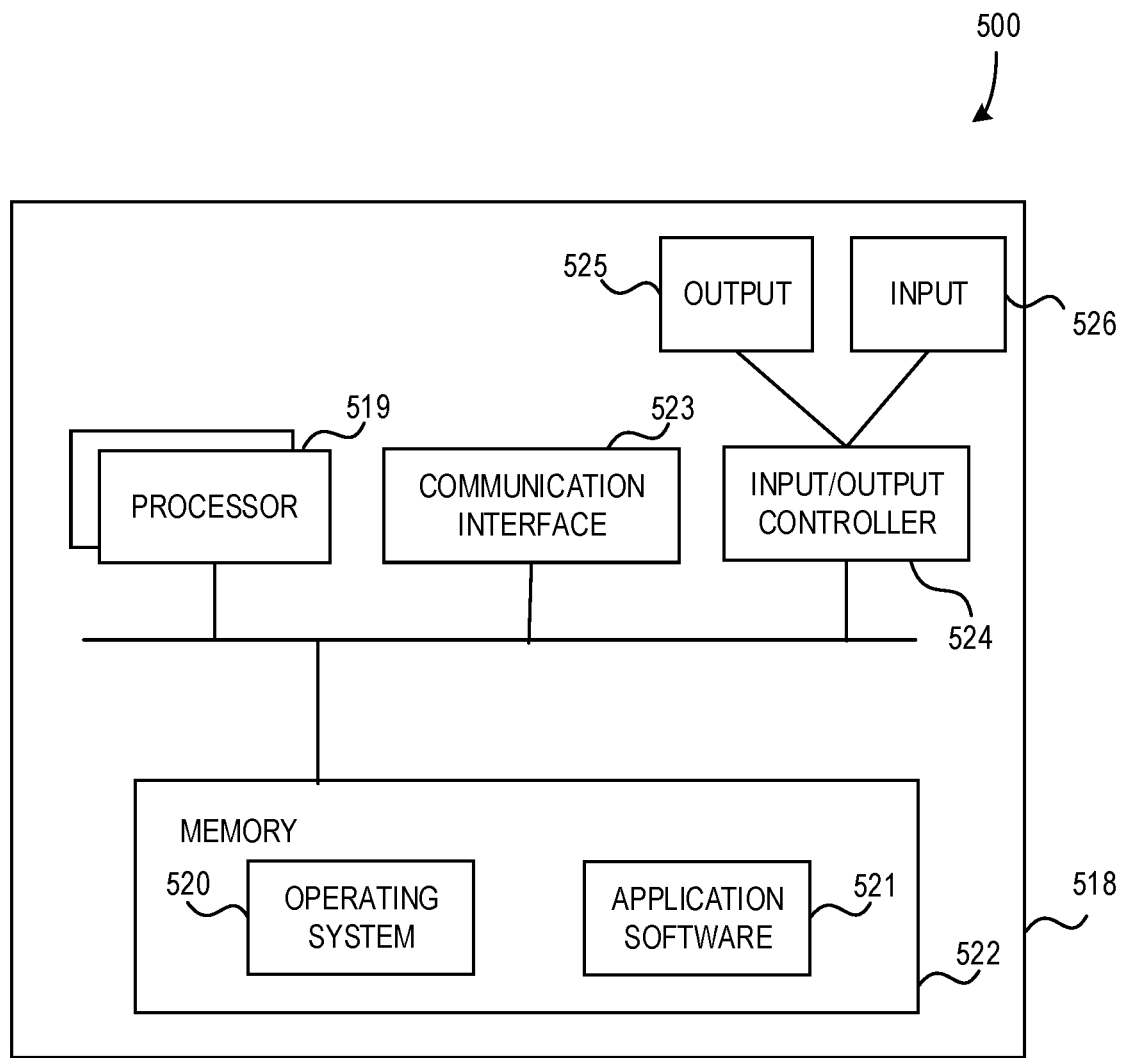
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an embodiment, deploying an application cluster based on a cluster definition and service templates as described herein may be accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for deploying an application cluster based on a cluster definition and service templates comprises: at least one processor; and at least one memory comprising computer program code, the at least one memory and the computer program code configured to, with the at least one processor, cause the at least one processor to: obtain a cluster definition from a repository; create a cluster on a cluster platform based on the cluster definition; identify a cluster type of the cluster based on the cluster definition; determine a service set from a service map based on the identified cluster type, the service map including at least one cluster type mapped to at least one service; obtain a service deployment template of each service of the service set; and deploy each service of the service set on the created cluster based on the obtained service deployment templates, whereby the cluster is configured for use according to the cluster type.

A computerized method for deploying an application cluster based on a cluster definition and service templates comprises: obtaining, by a processor, a cluster definition from a repository; creating, by the processor, a cluster on a cluster platform based on the cluster definition; identifying, by the processor, a cluster type of the cluster based on the cluster definition; determining, by the processor, a service set from a service map based on the identified cluster type, the service map including at least one cluster type mapped to at least one service; obtaining, by the processor, a service deployment template of each service of the service set; and deploying, by the processor, each service of the service set on the created cluster based on the obtained service deployment templates, whereby the cluster is configured for use according to the cluster type.

One or more non-transitory computer storage media having computer-executable instructions for deploying an application cluster based on a cluster definition and service templates, upon execution by a processor, causes the processor to at least: obtain a cluster definition from a repository; create a cluster on a cluster platform based on the cluster definition; identify a cluster type of the cluster based on the cluster definition; determine a service set from a service map based on the identified cluster type, the service map including at least one cluster type mapped to at least one service; obtain a service deployment template of each service of the service set; and deploy each service of the service set on the created cluster based on the obtained service deployment templates, whereby the cluster is configured for use according to the cluster type.

Alternatively, or in addition to the other examples described herein, examples include any combination of the following:

further comprising: monitoring, by the processor, at least one of the cluster definition or the service map for changes; and based on detecting a change to at least one of the cluster definition or the service map during monitoring, redetermining a service set for the cluster based on the detected change and redeploying each service of the redetermined service set on the created cluster.

wherein monitoring at least one of the cluster definition or the service map includes obtaining a version indicator of the at least one of the cluster definition or the service map and comparing the obtained version indicator with a previously obtained version indicator, wherein determining that the obtained version indicator indicates a different version than the previously obtained version indicator results in detection of a change to the at least one of the cluster definition or the service map during monitoring.

wherein identifying a cluster type of the cluster based on the cluster definition further includes identifying a plurality of cluster types of the cluster based on the cluster definition; and wherein determining a service set from the service map based on the identified cluster type further includes determining the service set from the service map based on the identified plurality of cluster types, such that the service set includes services associated with each cluster type of the identified plurality of cluster types.

wherein the plurality of cluster types includes a primary cluster type and at least one inherited cluster type that is associated with the primary cluster type.

wherein creating the cluster on the cluster platform based on the cluster definition further includes causing a network module to create a domain name service entry for the created cluster, whereby the created cluster is accessible via a network.

wherein deploying each service of the service set includes deploying at least one of a common application container, a control application container, a single-tenant application container, or a multi-tenant application container.

wherein the cluster platform is a KUBERNETES platform.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for deploying an application cluster based on a cluster definition and service templates, including exemplary means for obtaining, by a processor, a cluster definition from a repository; exemplary means for creating, by the processor, a cluster on a cluster platform based on the cluster definition; exemplary means for identifying, by the processor, a cluster type of the cluster based on the cluster definition; exemplary means for determining, by the processor, a service set from a service map based on the identified cluster type, the service map including at least one cluster type mapped to at least one service; exemplary means for obtaining, by the processor, a service deployment template of each service of the service set; and exemplary means for deploying, by the processor, each service of the service set on the created cluster based on the obtained service deployment templates, whereby the cluster is configured for use according to the cluster type.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

APPENDIX A

Additional Example Templates/Schema

Additional example Templates/Schema are shown below. These files describe the structure of CRDs for use in deploying clusters as described herein. The "Kustomization" file indicates the names of the other CRD templates associated with clusters, s3 storage, and mappings.

```
kustomization.yaml
    kind: Kustomization
    resources:
    - clusters-crd.yaml
    - s3-storage-crd.yaml
    - mappings-crd.yaml
clusters-crd.yaml
    kind: CustomResourceDefinition
    metadata:
        name: <cluster specification name>
    spec:
        group: <group name>
        version: v1beta1
        scope: Cluster
        names:
            plural: cluster-specifications
            singular: cluster-specification
            kind: ClusterSpec
```

```
                shortNames:
                    - mc-cs
                validation:
                    # openAPIV3Schema is the schema for validating custom
objects.
                    openAPIV3Schema:
                        properties:
                            spec:
                                properties:
                                    clusterURL:
                                        type: string
                                    clusterName:
                                        type: string
                                    vaultRoot:
                                        type: string
                                    baseFQDN:
                                        type: string
                                    clusterType:
                                        type: string
                                    clusterNodes:
                                        type: integer
                                        minimum: 3
                                        maximum: 100
                                    clusterPlan:
                                        type: string
                                    clusterNetworkProfileName:
                                        type: string
s3-storage-crd.yaml
        kind: CustomResourceDefinition
        metadata:
            name: <s3 specification name>
        spec:
            group: <group name>
            version: v1beta1
            scope: Cluster
            names:
                plural: s3-specifications
                singular: s3-specification
                kind: S3StorageSpec
                shortNames:
                    - mc-s3
            validation:
                # openAPIV3Schema is the schema for validating custom
objects.
                openAPIV3Schema:
                    properties:
                        spec:
                            properties:
                                s3Endpoint:
                                    type: string
                                s3StorageLocation:
                                    type: string
                                s3StorageEnvironment:
                                    type: string
mappings-crd.yaml
        kind: CustomResourceDefinition
        metadata:
            name: <mappings specification name>
        spec:
            group: <group name>
            version: v1beta1
            scope: Cluster
            names:
                plural: mapping-specifications
                singular: mapping-specification
                kind: MappingSpec
                shortNames:
                    - mc-ms
            validation:
                # openAPIV3Schema is the schema for validating custom
objects.
                openAPIV3Schema:
                    properties:
                        spec:
                            properties:
                                common:
                                    type: object
                                    properties:
                                        project:
                                            type: string
                                        apps:
                                            type: object
                                            properties:
                                                name:
                                                    type: string
                                                folderName:
                                                    type: string
                                                baseURL:
                                                    type: string
                                                automatedSync:
                                                    type: bool
                                control:
                                    type: object
                                    properties:
                                        project:
                                            type: string
                                        apps:
                                            type: object
                                            properties:
                                                name:
                                                    type: string
                                                folderName:
                                                    type: string
                                                baseURL:
                                                    type: string
                                                automatedSync:
                                                    type: bool
                                singleTenant:
                                    type: object
                                    properties:
                                        project:
                                            type: string
                                        apps:
                                            type: object
                                            properties:
                                                name:
                                                    type: string
                                                folderName:
                                                    type: string
                                                baseURL:
                                                    type: string
                                                automatedSync:
                                                    type: bool
                                multiTenant:
                                    type: object
                                    properties:
                                        project:
                                            type: string
                                        apps:
                                            type: object
                                            properties:
                                                name:
                                                    type: string
                                                folderName:
                                                    type: string
                                                baseURL:
                                                    type: string
                                                automatedSync:
                                                    type: bool
```

Additional Example Monitoring Templates

Additional example monitoring templates are shown below. These files describe an example set of template files for a monitoring service or application. The "Kustomization" file indicates the names of the other templates shown.

```
kustomization.yaml
    kind: Kustomization
    namespace: monitoring
    bases:
    - ../../namespaces/monitoring
    # use for ArgoCD Deployment
    # - <ArgoCD URL>/grafana/
    # - <ArgoCD URL>/grafana-dashboards/
    # - <ArgoCD URL>/prometheus/
```

```
# - <ArgoCD URL>/thanos/
# - <ArgoCD URL>/node-exporter/
# - <ArgoCD URL>/kube-state-metrics/
# - <ArgoCD URL>/elasticsearch-exporter
# use for local machine test-deployment (comment before
committing)
- <local machine location>/grafana/
- <local machine location>/grafana-dashboards/
- <local machine location>/prometheus/
- <local machine location>/thanos/
- <local machine location>/node-exporter/
- <local machine location>/kube-state-metrics/
- <local machine location>/elasticsearch-exporter
patchesStrategicMerge:
- patch-prometheus-server-statefulset.yaml
patchesJson6902:
- target:
    group: extensions
    version: v1beta1
    kind: Ingress
    name: grafana
  path: patch-grafana-ingress-host.yaml
- target:
    group: extensions
    version: v1beta1
    kind: Ingress
    name: thanos-query
  path: patch-thanos-query-ingress-host.yaml
configMapGenerator:
- name: grafana
  behavior: merge
  files:
  - datasources.yaml=grafana-datasources.yaml
patch-prometheus-server-statefulset.yaml
  kind: StatefulSet
  metadata:
    name: prometheus-server
  spec:
    template:
      spec:
        containers:
        - name: thanos-sidecar
          env:
          - name: CLUSTER
            value: control
patch-grafana-ingress-host.yaml
- op: replace
  path: /spec/rules/0/host
  value: grafana.$(CLUSTER_NAME).$(CLUSTER_FQDN)
- op: replace
  path: /spec/tls/0/hosts/0
  value: grafana.$(CLUSTER_NAME).$(CLUSTER_FQDN)
patch-thanos-query-ingress-host.yaml
- op: replace
  path: /spec/rules/0/host
  value: thanos-query.$(CLUSTER_NAME).$(CLUSTER_FQDN)
- op: replace
  path: /spec/tls/0/hosts/0
  value: thanos-query.$(CLUSTER_NAME).$(CLUSTER_FQDN)
grafana-datasources.yaml
  apiVersion: 1
  datasources:
  - access: proxy
    isDefault: false
    name: Prometheus
    type: prometheus
    url: http://prometheus-server
  - access: proxy
    isDefault: true
    name: Thanos
    type: prometheus
    url: http://thanos-query:<port>
  - access: proxy
    isDefault: false
    name: Global
    type: prometheus
    url: <Global query control URL>
    jsonData:
      tlsSkipVerify: true
  - access: proxy
    isDefault: false
    name: kube
    type: prometheus
    url: <Global query kube URL>
    jsonData:
      tlsSkipVerify: true
  - access: proxy
    isDefault: false
    name: jenkins
    type: prometheus
    url: <Global query Jenkins URL>
    jsonData:
      tlsSkipVerify: true
Storage Example
  # This is an example thanos storage configuration.
  # The access key and secret key must be populated
  # with valid values and then this needs to be
  # manually added to the target cluster as a
  # Kubernetes secret named "thanos-storage-config"
  # with a key of "storage.yaml".
  # The Secret should be created in the "monitoring"
  # namespace
  type: S3
  config:
    bucket: $(S3_LOCATION)-$(S3_ENVIRONMENT)-thanos-
$(CLUSTER_NAME)
    endpoint: $(S3_ENDPOINT)
    access key: "{{S3 ACCESS_KEY}}"
    secret key: "{{S3 SECRET_KEY}}"
    insecure: false
    signature version2: false
    encrypt sse: false
    http config:
      idle conn timeout: 0s
      insecure skip verify: false
```

What is claimed is:

1. A system for deploying an application cluster based on a cluster definition and service templates, the system comprising:
   at least one processor; and
   at least one memory comprising computer program code, the at least one memory and the computer program code configured to, with the at least one processor, cause the at least one processor to:
   obtain a cluster definition from a repository;
   create a cluster on a cluster platform based on the cluster definition;
   identify a cluster type of the cluster based on the cluster definition;
   determine a service set from a service map based on the identified cluster type, the service map including at least one cluster type mapped to at least one service;
   obtain a service deployment template of each service of the service set; and
   deploy each service of the service set on the created cluster based on the obtained service deployment templates, whereby the cluster is configured for use according to the cluster type.

2. The system of claim 1, wherein the at least one memory and the computer program code are configured to, with the at least one processor, further cause the at least one processor to:
   monitor at least one of the cluster definition or the service map for changes; and
   based on detecting a change to at least one of the cluster definition or the service map during monitoring, redetermine a service set for the cluster based on the detected change and redeploy each service of the redetermined service set on the created cluster.

3. The system of claim 2, wherein monitoring at least one of the cluster definition or the service map includes obtaining a version indicator of the at least one of the cluster definition or the service map and comparing the obtained version indicator with a previously obtained version indicator, wherein determining that the obtained version indicator indicates a different version than the previously obtained version indicator results in detection of a change to the at least one of the cluster definition or the service map during monitoring.

4. The system of claim 1, wherein identifying a cluster type of the cluster based on the cluster definition further includes identifying a plurality of cluster types of the cluster based on the cluster definition; and
wherein determining a service set from the service map based on the identified cluster type further includes determining the service set from the service map based on the identified plurality of cluster types, such that the service set includes services associated with each cluster type of the identified plurality of cluster types.

5. The system of claim 4, wherein the plurality of cluster types includes a primary cluster type and at least one inherited cluster type that is associated with the primary cluster type.

6. The system of claim 1, wherein creating the cluster on the cluster platform based on the cluster definition further includes causing a network module to create a domain name service entry for the created cluster, whereby the created cluster is accessible via a network.

7. The system of claim 1, wherein deploying each service of the service set includes deploying at least one of a common application container, a control application container, a single-tenant application container, or a multi-tenant application container.

8. A computerized method for deploying an application cluster based on a cluster definition and service templates, the method comprising:
obtaining, by a processor, a cluster definition from a repository;
creating, by the processor, a cluster on a cluster platform based on the cluster definition;
identifying, by the processor, a cluster type of the cluster based on the cluster definition;
determining, by the processor, a service set from a service map based on the identified cluster type, the service map including at least one cluster type mapped to at least one service;
obtaining, by the processor, a service deployment template of each service of the service set; and
deploying, by the processor, each service of the service set on the created cluster based on the obtained service deployment templates, whereby the cluster is configured for use according to the cluster type.

9. The computerized method of claim 8, further comprising:
monitoring, by the processor, at least one of the cluster definition or the service map for changes; and
based on detecting a change to at least one of the cluster definition or the service map during monitoring, redetermining a service set for the cluster based on the detected change and redeploying each service of the redetermined service set on the created cluster.

10. The computerized method of claim 9, wherein monitoring at least one of the cluster definition or the service map includes obtaining a version indicator of the at least one of the cluster definition or the service map and comparing the obtained version indicator with a previously obtained version indicator, wherein determining that the obtained version indicator indicates a different version than the previously obtained version indicator results in detection of a change to the at least one of the cluster definition or the service map during monitoring.

11. The computerized method of claim 8, wherein identifying a cluster type of the cluster based on the cluster definition further includes identifying a plurality of cluster types of the cluster based on the cluster definition; and
wherein determining a service set from the service map based on the identified cluster type further includes determining the service set from the service map based on the identified plurality of cluster types, such that the service set includes services associated with each cluster type of the identified plurality of cluster types.

12. The computerized method of claim 11, wherein the plurality of cluster types includes a primary cluster type and at least one inherited cluster type that is associated with the primary cluster type.

13. The computerized method of claim 8, wherein creating the cluster on the cluster platform based on the cluster definition further includes causing a network module to create a domain name service entry for the created cluster, whereby the created cluster is accessible via a network.

14. The computerized method of claim 8, wherein deploying each service of the service set includes deploying at least one of a common application container, a control application container, a single-tenant application container, or a multi-tenant application container.

15. The computerized method of claim 8, wherein the cluster platform is a KUBERNETES platform.

16. One or more non-transitory computer storage media having computer-executable instructions for deploying an application cluster based on a cluster definition and service templates that, upon execution by a processor, cause the processor to at least:
obtain a cluster definition from a repository;
create a cluster on a cluster platform based on the cluster definition;
identify a cluster type of the cluster based on the cluster definition;
determine a service set from a service map based on the identified cluster type, the service map including at least one cluster type mapped to at least one service;
obtain a service deployment template of each service of the service set; and
deploy each service of the service set on the created cluster based on the obtained service deployment templates, whereby the cluster is configured for use according to the cluster type.

17. The one or more non-transitory computer storage media of claim 16, wherein the computer-executable instructions, upon execution by the processor, further cause the processor to at least:
monitor at least one of the cluster definition or the service map for changes; and
based on detecting a change to at least one of the cluster definition or the service map during monitoring, redetermine a service set for the cluster based on the detected change and redeploy each service of the redetermined service set on the created cluster.

18. The one or more non-transitory computer storage media of claim 17, wherein monitoring at least one of the cluster definition or the service map includes obtaining a version indicator of the at least one of the cluster definition or the service map and comparing the obtained version indicator with a previously obtained version indicator, wherein determining that the obtained version indicator indicates a different version than the previously obtained version indicator results in detection of a change to the at least one of the cluster definition or the service map during monitoring.

19. The one or more non-transitory computer storage media of claim 16, wherein identifying a cluster type of the cluster based on the cluster definition further includes identifying a plurality of cluster types of the cluster based on the cluster definition; and wherein determining a service set from the service map based on the identified cluster type further includes determining the service set from the service map based on the identified plurality of cluster types, such that the service set includes services associated with each cluster type of the identified plurality of cluster types.

20. The one or more non-transitory computer storage media of claim 19, wherein the plurality of cluster types includes a primary cluster type and at least one inherited cluster type that is associated with the primary cluster type.

* * * * *